June 28, 1966            B. GALANTE            3,258,595
REMOTELY OPERATED SELF-POWERED OBSERVATION DEVICE INCLUDING
REMOTELY CONTROLLABLE VISUAL SCANNING MEANS
Filed May 6, 1963            2 Sheets-Sheet 1
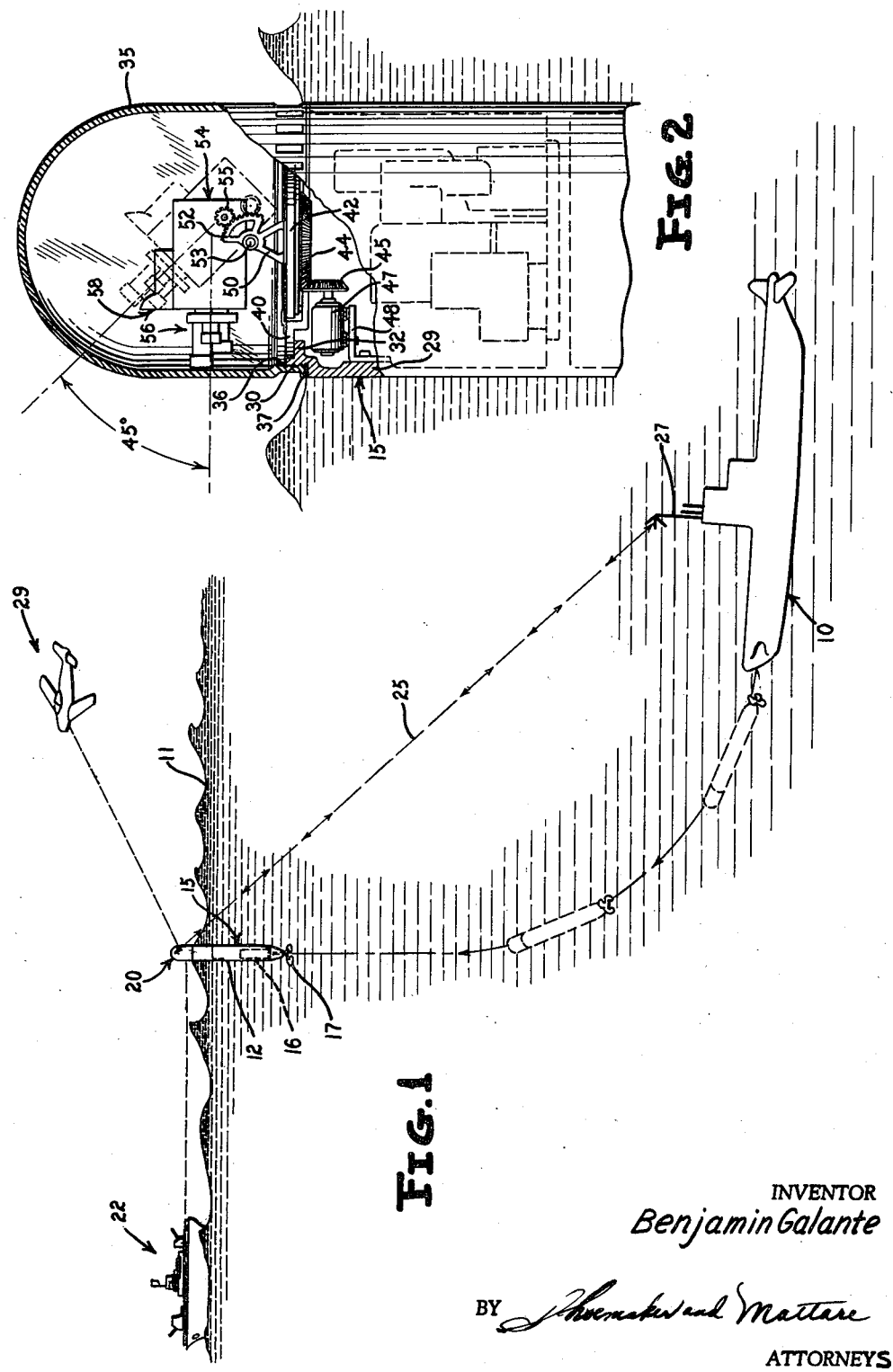
INVENTOR
*Benjamin Galante*
BY *Shoemaker and Mattare*
ATTORNEYS June 28, 1966    B. GALANTE    3,258,595
REMOTELY OPERATED SELF-POWERED OBSERVATION DEVICE INCLUDING
REMOTELY CONTROLLABLE VISUAL SCANNING MEANS
Filed May 6, 1963    2 Sheets-Sheet 2

INVENTOR
Benjamin Galante
BY Shoemaker and Mattare
ATTORNEYS

United States Patent Office 3,258,595
Patented June 28, 1966

3,258,595
REMOTELY OPERATED SELF-POWERED OBSERVATION DEVICE INCLUDING REMOTELY CONTROLLABLE VISUAL SCANNING MEANS
Benjamin Galante, 1740 W. 11th St., Brooklyn 23, N.Y.
Filed May 6, 1963, Ser. No. 278,217
7 Claims. (Cl. 250—199)

The present invention relates to new and novel remotely controlled observation means, and more particularly to an observation means which is adapted for movement through water and which utilizes a laser beam for communication with a remote control station.

The remotely controlled observation means of the present invention may, of course, be utilized in many different applications, but it is particularly suitable for use in combat operations in conjunction with a submarine. A submarine is, of course, in its safest position wherein maximum protection is afforded when it is submerged a substantial distance beneath the surface of the water within which it travels. When the submarine is so submerged, it is normally not practicable to provide a periscope means or similar arrangement which could extend to the surface so as to provide a visual observation of the surrounding surface and air directly over and about the position of the submarine. It accordingly becomes necessary to provide an auxiliary remotely controlled observation means in order to provide the desired degree of visual observation, such remotely controlled observation means being capable of movement to a distant location which is further advantageous since it does not tend to reveal the exact location of the submarine such that the submarine can remain undetected.

The remotely controlled observation means of the present invention incorporates its own driving means for propelling the body means through the water such that the body means may be readily controlled for movement into a desired remote location at a substantial distance from the remote control station in the submarine.

The body means incorporates an observation means which preferably may take the form of a television camera means which is controlled in its movements and focusing by means of a remote control system incorporated within the body means. This remote control system is controlled from the control station in the submarine so as to enable maneuvering of the body means and then operation of the observation means from a remote location.

It will, of course, be understood that while the present invention is particularly adapted for use in connection with submarines, it may also be controlled from a control station disposed either within a ship traveling on the surface of the water, or an airplane traveling over the surface of the water.

The observation means of the present invention is so mounted and controlled that it is adapted to provide a visual indication of the entire area about the observation means on the surface as well as overhead such that the apparatus is adapted to detect the presence of objects such as ships traveling on the surface of the water as well as airplanes or other lighter than air craft traveling in the air over the area about the observation means.

The present invention employs a novel communication system in the form of a laser means wherein a laser beam is utilized for transmitting signals from a remote control station to the apparatus of the present invention and vice versa. This particular type of communication means is advantageous in connection with combat operations in that the chance of interception or detection of the beam is substantially less than other types of communication systems now employed for communicating with various components which are submerged in water. The overall arrangement is accordingly such that the submarine may remain submerged at a safe distance from the remotely controlled observation means and the possibility of detection thereof is minimized.

The apparatus of the present invention is adapted to send a signal back to the remote control station which is disposed in the submarine which will provide information as to the exact location and speed of objects relative to the remote control station such that personnel on the submarine are advised of the position of enemy craft and furthermore are provided with sufficient data to be utilized in connection with a computer and the like for discharging a torpedo or similar weapon to intercept the craft while the submarine remains at all times submerged and protected from attack.

All of the above desired objectives of the present invention are attained with the utilization of a relatively simple structure wherein a conventional torpedo may be modified by removing the warhead therefrom and replacing such warhead with the remote control system of the present invention and an observation end portion within which the television camera means or the like may be mounted, this end portion being formed of transparent material such that the television camera means can be operative for scanning the desired area.

In order to suitably observe the entire desired area, the television camera means of the present invention may be rotated through 360° of movement, and may be tilted up and down, these movements being controlled from the remote control station on the submarine and preferably at predetermined regular intervals so that the position of objects detected by the observation means may be readily oriented. The remotely controlled observation means of the present invention may also be readily camouflaged so as to resemble debris or other floating matter so as to escape detection.

The apparatus of the present invention may be also employed for providing information as to the depth of the water within which the apparatus is disposed as well as the location of adjacent mines. The apparatus is further provided with infrared lamp means as well as lens means on the television camera means which is adapted to detect infrared radiation such that the apparatus may be employed at night when insufficient light is available for use of the television camera means.

Suitable monitor means may be provided in the submarine such that a fix can be obtained on any object detected by the observation means and the relative position and speed with respect to the submarine can be readily determined. This information can be placed on video tape if desired such that the information can be employed at a later date if desired.

An object of the present invention is to provide new and novel remotely controlled observation means which is adapted for movement through water and which is particularly useful in conjunction with submarines.

Another object of the invention is the provision of remotely controlled observation means which is adapted to be positioned at the surface of the body of water and which is adapted to provide at a remote location a visual indication of the entire area about the observation means on the surface of the water as well as the air space overhead.

A further object of the invention is to provide a remotely controlled observation means incorporating a construction which permits the submarine to remain submerged, safe and undetected while the observation means is operating.

Still another object of the invention is the provision of remotely controlled observation means which provides information as to location of objects and provides sufficient information to permit the discharge of torpedos or similar weapons to intercept enemy craft while the submarine is submerged.

A still further object of the invention is to provide remotely controlled observation means which is relatively simple and inexpensive in construction, and yet which is quite efficient and reliable in use.

Other objects and many attendant advantages of the invention will become more apparent when considered in connection with the specification and accompanying drawings, wherein:

FIG. 1 is a diagrammatic view illustrating the manner of use of the apparatus of the present invention;

FIG. 2 is an elevational view partly broken away illustrating the apparatus in operative position at the surface of a body of water;

Figure 3:
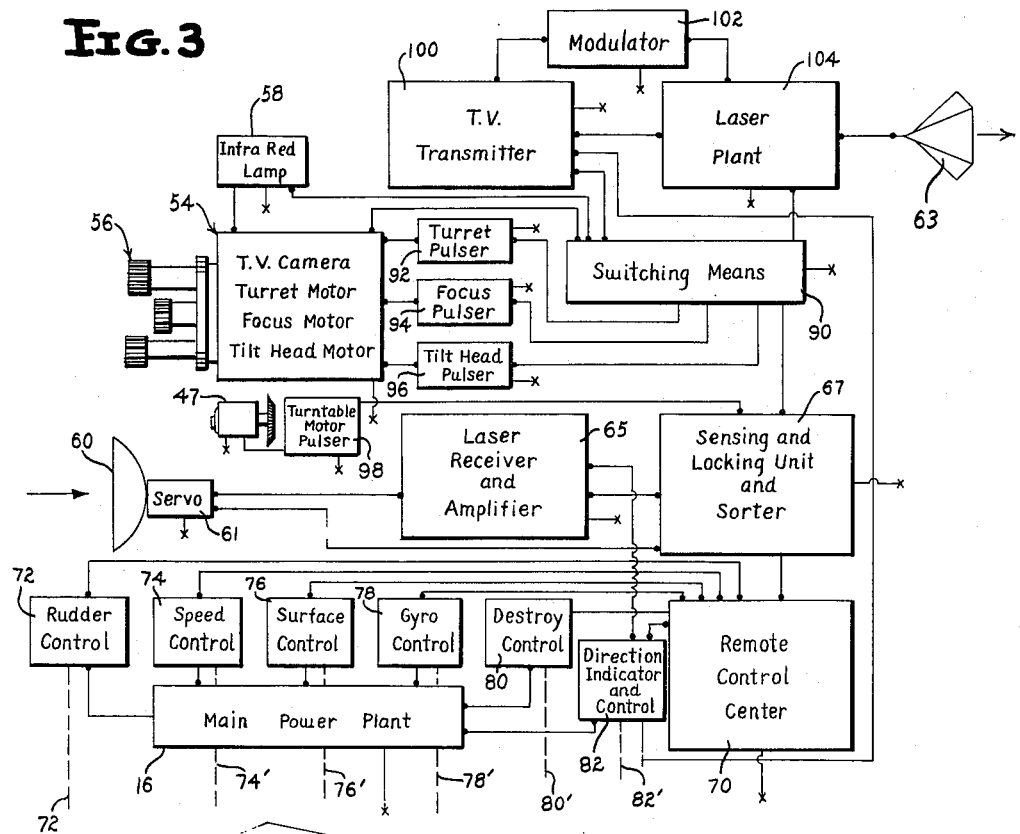
FIG. 3 is a schematic wiring diagram of the electrical remote control system circuit of the present invention.

Referring now to the drawings wherein like reference characters designate corresponding parts throughout the several views, FIG. 1 illustrates a submarine indicated generally by reference numeral 10 which has launched a remotely controlled observation means according to the present invention, this means resembling a conventional torpedo with certain modifications as discussed hereinbefore, the observation means being illustrated in FIG. 1 in full lines as disposed in its operative position at the surface of the water as indicated by reference numeral 11, the observation means being indicated generally by reference numeral 12.

The remotely controlled observation means includes a body means 15 having therein a main power plant 16 which may be of the conventional type generally utilized with modern torpedoes, this power plant being connected with a conventional screw 17 for propelling the apparatus through the water in a well-known manner. It will also be understood that the body means of the present invention incorporates the usual controls as are provided on torpedoes such as the rudder control, speed control means, surface control means, gyro control means, and a destroy control means for destroying the entire apparatus if some malfunction or other circumstance should dictate that such source of action is desirable.

It will be noted in FIG. 1 that the body means of the present invention is illustrated in dotted lines in two different locations to indicate the path along which the body means travels as further indicated by the arrows in moving from the submarine to its final operative position wherein the upper end portion which is the observation end portion as indicated by reference numeral 20 extends above the surface of the water so that the television camera means may readily scan the desired area.

FIG. 1 illustrates a ship indicated generally by reference numeral 22 which is traveling along the surface of the water, and aircraft indicated generally by reference numeral 24 is illustrated as flying over the area scanned by the observation means of the present invention. As pointed out hereinafter, the television camera means of the present invention is adapted to pick up and detect each of these objects, and to relay such information back to the submarine. As mentioned previously, laser communication means is provided for relaying information back and forth between the submarine and the apparatus of the present invention, and the laser beam is indicated by the line 25 in FIG. 1, this beam being received by laser receiver or pick-up means in the head of the apparatus of the present invention and at the top of an antenna means 27 mounted on the submarine. The laser pick-up and director means of the present invention are of conventional well-known construction, and the laser beam is effective for transmitting the desired signals over a substantial distance through water.

Referring now to FIG. 2 of the drawings wherein the upper portion of the body means is illustrated in more detail, body means 15 includes a substantially cylindrical side wall portion 29 which is provided with an annular recessed portion having threads 30 formed thereon at the upper end thereof, an inwardly projecting annular shoulder 32 being provided at such upper end of the body means. A substantially dome-shaped cover portion 35 is provided, this portion being formed of a suitable transparent material such as plastic and the like and having internal threads 36 formed at the lower end thereof whereby the cover portion may be secured in operative position on the threaded upper end of the body means while compressing a sealing gasket 37 between the cover portion and the body means to assure an effective fluid-tight seal therebetween.

A substantially circular table support means 40 is supported on the inwardly extending shoulder 32 and serves to rotatably support a turntable 42. Turntable 42 has a bevel gear 44 secured thereto which meshes with a cooperating bevel gear 45 drivingly connected with a suitable means such as an electric motor 47 which is mounted on a bracket member 48 secured to the inner surface of the side wall portion 29. It is apparent that operation of the motor 47 will result in rotation of the turntable 42 for a purpose hereinafter described.

A support means 50 extends upwardly from the turntable 42 and a fixed sector gear portion 52 is mounted at the upper portion of the support means. A pivot pin 53 is supported by support portion 50 and serves to pivotally mount a television camera means indicated generally by reference numeral 54.

The television camera means 54 is provided with a gear member 55 which is connected with a tilt head motor (not shown) disposed within the television camera mechanism indicated generally by reference numeral 54, operation of the tilt head motor serving to turn gear 55 which in turn will cause the television camera means to tilt through an angle of approximately 45° from the horizontal as indicated in FIG. 2, the camera means being shown in phantom line in its upwardly tilted position at 45° to the horizontal. The television camera means is provided with a more or less conventional turret mechanism 56 incorporating a plurality of lenses for focusing at different distances, a turret motor being provided for turning the turret so as to utilize different lenses at different times as is well understood in the art, a focus motor being interconnected with the lens mechanism so as to properly focus any individual lense which may be disposed before the television camera means.

One of the lenses in the turret mechanism 56 is adapted to detect infrared radiations, and an infrared lamp means 58 is mounted on the upper portion of the camera means so as to direct a beam of infrared light outwardly of the apparatus when sufficient light is not available for illustrating objects which it is desired to detect. In other words, the infrared lamp means will be utilized at night in conjunction with the particular lens means of the turret mechanism which is adapted to detect infrared radiation.

Referring now to FIG. 3 of the drawings, the remote control system electrical circuit is illustrated schematically, a conventional laser pick-up means being indicated by reference numeral 60 and being interconnected with a mechanical servo-mechanism 61 adapted to properly orient the laser pick-up means and lock it in with the laser beam from the submarine so that continuous communication will be provided between the submarine and the remotely controlled observation means. A conventional laser director 63 at the righthand portion of FIG. 3 is illustrated as being separated from the laser pick-up for the purpose of illustrating the electrical circuit, but in actual practice, the laser director means 63 will be disposed closely adjacent to the laser pick-up means and mechanically tied thereto such that the two mechanisms move in unison so as to retain each of these mechanisms locked in with the cooperating mechanisms on the submarine.

The output of the laser receiver or pick-up means 60 is connected with a laser receiver and amplifier 65 of relatively conventional construction, the output of which in turn is connected with a sensing and locking unit and sorter means indicated by reference numeral 67. This sorter means 67 separates out the desired information from the incoming modulated signal and diverts the information to other components of the control system as will hereinafter be apparent. In addition, a signal is fed back from means 67 to the servo-mechanism 61 to retain the laser pick-up and director means locked in as previously discussed.

Signals from unit 67 are fed into a remote control center means indicated by reference numeral 70 from whence suitable signals are directed to the rudder control means 72, the speed control means 74, the surface control means 76, the gyro control means 78, and the destroy control means 80, each of elements 72, 74, 76, 78 and 80 being of conventional construction as normally associated with a torpedo mechanism. All of these latter components are connected with the main power plant 16 which provides the power which may be in the form of electrical energy for operating these various components. Direction indicator and control means 82 is also connected with the main power plant to derive power therefrom, the dotted lines 72', 74', 76', 78', 80' and 82' indicating schematically suitable conections with the various components of the normal torpedo mechanism as will be well understood.

The direction indicator and control means 82 is also connected with the laser receiver and amplifier as well as the remote control center and also with the television transmitter hereinafter described. The direction indicator means transmits to the submarine the direction in which the remotely controlled observation means is traveling. The control means enables the submarine to guide and steer the direction of the observation means since it is interconnected between the laser receiver and the rudder control mechanism.

The output signals from unit 67 are also connected with a switching means indicated generally by reference numeral 90, the output of which is connected with a turret pulser 92, a focus pulser 94, a tilt head pulser 96, and a turntable motor pulser 98. These various pulsers are in turn connected respectively with the turret motor, the focus motor, the tilthead motor, and the turntable motor. The various pulser mechanisms are arranged to cause operation of the motors associated therewith at regular intervals so as to cause the television camera means to rotate through an angle of 360° at certain intervals and to tilt up and down through an angle of 45° at regular intervals. In this manner, the television camera means is adapted to scan the desired area of the surface as well as the overhead air space.

A television transmitter 100 is provided for transmitting signals back to the submarine in accordance with the output of the television camera means 54, the transmitter means 100 being connected through a modulator 102 with a laser plant means 104 which in turn is connected with the laser director 63 whereby the desired information is directed back to the submarine in a laser beam.

The various elements of the remote control circuit are each adapted to receive electrical power from the main power plant, these connections being indicated schematically by the lead lines having a small x at the outer ends thereof.

Figure 4:
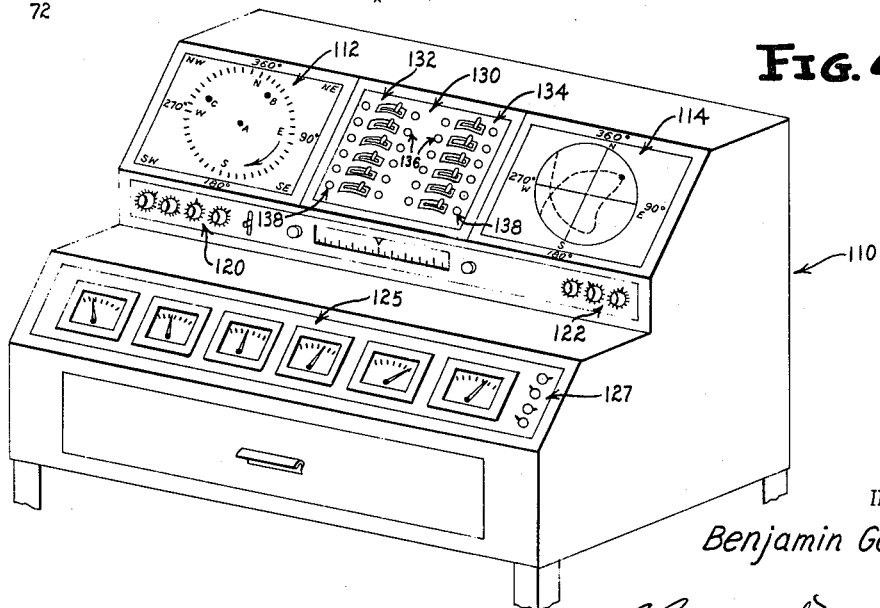
FIG. 4 is a perspective view of a remote control station which may be disposed for example in a submarine.

Referring now to FIG. 4 of the drawings, the remote control station provided in the submarine is illustrated, and may include a large table 110 having a pair of monitor screens 112 and 114 thereon. As illustrated on monitor screen 112, point a represents the position of the remotely controlled observation means, while point b represents the location of a ship such as illustrated at 22 in FIG. 1, and point c represents the position of an aircraft such as indicated at 24 in FIG. 1 of the drawings. It is apparent that with the aid of this type of monitor screen the relative position and speed of various contacts may be visually observed, and suitable data may be obtained for launching a torpedo or taking whatever action is considered necessary.

Monitor screen means 114 may for example illustrate the position of other submarines which can be tracked with underwater guiding equipment which may be made a part of the equipment of the remotely controlled observation means.

The remote control station is also illustrated as incorporating suitable control mechanisms as indicated generally by reference numerals 120 and 122 as well as various indicating dials indicated generally by reference numeral 125, the operation of these various indicating dials being controlled by operation of switches indicated generally by reference numeral 127.

In the central portion of the means 110, there is disposed a torpedo tube control panel indicated generally by reference numeral 130. It will be observed that this control panel includes a first row of switches indicated generally by reference numeral 132 which may control the firing of the portside torpedo tubes, while a second row of switches 134 are provided for controlling the operation of the starboard side torpedo tubes. Inner rows of lights 136 on the panel may be colored red and indicate a "hold" condition, while outer rows of lights 138 may be colored green and indicate a "ready" condition of the torpedo tubes whereby firing of the torpedoes may be readily controlled at the remote control station.

It is apparent from the foregoing that there is provided according to the present invention a remotely controlled observation means particularly adapted for use in water and especially useful in conjunction with submarines. The observation means of the present invention is adapted to be utilized at the surface of the water and is adapted to provide at a remote location a visual indication of the entire area about the observation means as well as the air space overhead. The arrangement of the present invention permits operation either at day or night, and allows the submarine to remain submerged in a safe position throughout the desired operation so as to minimize the possibility of detection of the location of the submarine. The remotely controlled observation means provides information as to the location of objects in the general area of the observation means and provides sufficient data to permit the discharging of torpedoes along a collision course with craft moving about in the water adjacent thereto. The construction of the present invention is quite simple and relatively inexpensive and yet at the same time is quite efficient and reliable in use.

As this invention may be embodied in several forms without departing from the spirit or essential characteristics thereof, the present embodiment is therefore illustrative and not restrictive, and since the scope of the invention is defined by the apended claims, all changes that fall within the metes and bounds of the claims or that form their functional as well as conjointly cooperative equivalents are therefore intended to be embraced by those claims.

What is claimed is:

1. Remotely controlled observation means comprising a body means including drive means for moving the body means and control means for controlling the direction and speed of the body means so as to position the body means in a desired remote location, said body means including an observation end portion formed at least partially of transparent material, a television camera means disposed within said observation end portion, said body means also including operating means for controlling, turning and tilting movement of the television camera with respect to said body means as well as focusing thereof, said body means including a remote control system and a laser communication means, said operating means being adapted to turn and tilt the television camera with respect to said body means and independently of movements of said body means, said laser communication means including a laser receiver means, laser director means, and laser plant means connected with said laser director means.

2. Apparatus as defined in claim 1 including means for locking said laser receiver and director means to a cooperating unit at a remote control station so as to continuously maintain communication between said remote control system and a remote control station.

3. Apparatus as defined in claim 1 wherein said remote control system includes a television transmitter means connected with said television camera means, said television transmitter means being connected with modulator means which in turn is connected with said laser plant means.

4. The method of remote observation comprising providing a body means including drive means for moving the body means and control means for controlling the direction and speed of the body means so as to position the body means in a desired remote location, said body means also including an observation end portion formed at least partially of transparent material and a television camera means disposed within said observation end portion, said body means also including operating means for controlling turning and tilting movement of the television camera with respect to the body means, said body means including a remote control system and a laser communication means, providing a remote control station having laser communication means, providing laser communication from said remote control station to said body means to operate the control means for controlling the direction and speed of the body means whereby the body means is moved to a desired remote location, then controlling said operating means from said remote control station to turn and tilt the television camera means into desired positions with respect to the body means and to focus the television means for observation purposes, and relaying information from said television means back to said remote control station by means of the laser communication means.

5. The method as defined in claim 4 including the additional step of generating infrared radiations, and detecting such infrared radiations with said television camera means.

6. The method as defined in claim 4 including the step of maintaining continuous communication between said remote control system and a remote control station having laser communication means regardless of the relative position of said body means and such remote control station.

7. The method as defined in claim 4 including the step of generating a signal in accordance with the output of said television camera means, modulating said signal, and then transmitting the modulated signal to the laser communication means.

References Cited by the Examiner

UNITED STATES PATENTS

| | | | |
|---|---|---|---|
| 2,215,365 | 9/1940 | Vestergren | 178—6.8 |
| 2,423,836 | 7/1947 | Lake et al. | 325—116 X |
| 2,472,889 | 6/1949 | Du Mont | 250—199 X |
| 2,515,254 | 7/1950 | Nosker | 178—6 |
| 2,792,190 | 5/1957 | Seibold | 178—6 |
| 2,842,760 | 7/1958 | McLucas | 178—6.8 X |
| 3,033,924 | 5/1962 | Ainsworth | 178—6.8 |

OTHER REFERENCES

Dulberger et al.: Electronics, Nov. 3, 1961, pp. 40–44.
Rediker et al.: Electronics, Oct. 5, 1962, pp. 44 and 45.

DAVID G. REDINBAUGH, *Primary Examiner.*

J. W. CALDWELL, *Assistant Examiner.*